United States Patent
Epstein

(10) Patent No.: US 6,453,416 B1
(45) Date of Patent: Sep. 17, 2002

(54) SECURE PROXY SIGNING DEVICE AND METHOD OF USE

(75) Inventor: Michael A. Epstein, Spring Valley, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 08/994,873

(22) Filed: Dec. 19, 1997

(51) Int. Cl.$^7$ .................................................. H04L 9/30
(52) U.S. Cl. ................................. 713/170; 380/30
(58) Field of Search ........................ 713/170, 176, 713/179, 180; 380/30

(56) References Cited

U.S. PATENT DOCUMENTS

| | | | | |
|---|---|---|---|---|
| 5,136,647 A | * | 8/1992 | Haber et al. ................... | 380/30 |
| 5,659,616 A | * | 8/1997 | Sudia ........................... | 380/23 |
| 5,696,823 A | * | 12/1997 | Blaze ........................... | 380/21 |
| 5,754,656 A | * | 5/1998 | Nishioka et al. ............... | 380/25 |
| 5,790,677 A | * | 8/1998 | Fox et al. ...................... | 380/24 |
| 5,825,880 A | * | 10/1998 | Sudia et al. ................... | 380/21 |
| 5,903,882 A | * | 5/1999 | Asay et al. .................... | 705/44 |
| 5,907,619 A | * | 5/1999 | Davis ........................... | 380/23 |
| 5,912,974 A | * | 6/1999 | Hollowoy et al. ............. | 380/25 |
| 5,995,626 A | * | 11/1999 | Nishioka et al. .............. | 380/25 |

OTHER PUBLICATIONS

Schneier, Bruce, Applied Cryptography, 1996, John Wiley & Sons, Inc. $2^{nd}$ edition, pp. 458–459.*
Bruce Schneier, Applied Cryptography, 1996, pp. 38, 55.*

* cited by examiner

Primary Examiner—Gilberto Barron
Assistant Examiner—Douglas J. Meislahn
(74) Attorney, Agent, or Firm—Michael Schmitt

(57) ABSTRACT

A digital signature of a document is formed in a digital signing device by using a private key stored in the digital signing device. A number of data items are supplied to the signing device. The signing device uses the data items to derive and authenticate a document hash. The digital signature is only formed if the derived document hash is authenticated.

13 Claims, 2 Drawing Sheets

SECURE PROXY SIGNING DEVICE AND METHOD OF USE

BACKGROUND OF THE INVENTION

1. Field of the Invention

The present invention relates to secure proxy signing devices for forming and supplying digital signatures over a network on behalf of users so that private keys are never extant at user equipment which is not secure, and to methods of using, and systems employing, such devices.

2. Description of the Related Art

Digital signatures are generally produced by encrypting a hash of a document with the private key of a public key/private key pair unique to the user (generated e.g. by RSA or El Gamal algorithms) to manifest the user's approval of the document. The term "document" is used throughout this application to indicate or include any digital data, program, or file or a plurality or combination thereof. A hash is produced by applying a secure hash function (such as SHA-1 or RIPEMD) to reduce such data to a bit string of a fixed predetermined length (e.g. 160 bits if SHA-1 is used). A person having both a document and an associated digital signature can verify these items by comparing the result of decrypting the digital signature using the public key of the user with the result of hashing the document using the secure hash function. Such verification depends on the assumption that the private key is secret and is only known or used by or on behalf of the user. Yet if a private key is stored or even temporarily extant at user equipment such as a personal computer connected to an insecure network such as the Internet, there is the risk that a malicious program could be planted in the PC which would extract keys and send them over the network to an unscrupulous person.

To avoid this risk, it has been proposed to form the digital signature in a user's smartcard placed in a smartcard reader associated with the user's equipment. The smartcard is a secure proxy signing device because it uses a private key which never leaves the card. However, a hash of the document to be signed has to be presented to the smartcard in order for the smartcard to form the digital signature. This need to present the document hash to the smartcard raises the risk, particularly in systems where there is an insecure link between the process in which the hash is generated and the smartcard, that a phony document hash could be presented to the smartcard by an impersonator for signature on behalf of a user.

For example, if the document hash is generated by a Java (a trademark of Sun Microsystems Inc.) applet running on user equipment under a browser, such an applet process cannot access local disks or local I/O. Therefore, the smartcard reader cannot be accessed directly from the applet process, and consequently, communication between the applet process and a background process communicating with the smartcard must take place by server echoing via the insecure network. Such communication would thereby be exposed to an eavesdropper monitoring the insecure network, and the smartcard would be vulnerable to being spoofed by presentation to it of a phony document hash, for example in a block replay attack where previous authentic communications to the smartcard, or portions thereof, are replayed.

Another approach to avoiding the risk of key extraction from insecure user equipment is described in U.S. Pat. No. 5,208,858 wherein the private keys of all users are stored and maintained at a server functioning as a proxy signing device. Therein, a hash of the approved document is sent from the user equipment to the server via the network. At the server, the received hash is encrypted with the user's private key available at the server to form a digital signature which is combined with the user's public key and further data to form a so-called certificate which is transmitted to the user equipment for checking. At the user equipment, the result of decrypting the signature with the user's public key is compared with the document hash which was sent. If the compared items are the same, the document and the signature-containing certificate may be sent directly from the user equipment to the desired recipients.

The method of U.S. Pat. No. 5,208,858 has the drawback of the need to send the digital signature back to the originator for checking and also that the server must be located in a highly secure place because the private keys are stored therein in the clear (or at least in a form from which they can be derived by the server). It should be noted that the consequences of a person of malevolent intent compromising the server and obtaining the stored private keys are catastrophic, potentially rendering unreliable all digital signatures made with the system at any time. Further, in this known method it appears that the server could be tricked by a block-replay attack or a man-in-the middle attack into signing a document which did not originate from the user on behalf of whom the signature is sought, or signing unauthorized duplicates of authentic documents.

SUMMARY OF THE INVENTION

It is a general object of the present invention to provide a secure proxy signing device, and a system and method for using such a device, to form digital signatures which are supplied over an insecure network, such as the Internet, which provides security measures directed against the possibility that the proxy signing device is presented by an impersonator of the user with an unauthentic document hash for signature via the network. It is a further object of the present invention that the security measures guard against block-replay and man-in-the-middle attacks.

Briefly, the aforementioned and other objects are satisfied by providing a proxy signing device for forming a digital signature of a document using a private key stored within the signing device and data items supplied to the signing device from which a hash of the document is derived and authenticated by means within the signing device. Said signing device further comprises means for encrypting the document hash with the private key to form the digital signature only if the document hash has been authenticated. The invention is further characterized in that said means for deriving and authenticating the document hash is configured for authenticating a derived document hash on a condition that first data derived at least in part from one of said data items is the same as second data equal to or derived from another of said data items.

More particularly, the proxy signing device comprises a random number generator, and the first data is derived from a combination of the derived document hash, a number stored in the proxy signing device which was previously generated by the random number generator and communicated to the signing device, and user identifying data stored in the signing device and only obtainable at the user equipment by interaction with a physically present user, such as a password or passphrase entered by the user or biometric data (hash of a fingerprint, voiceprint, retina scan, or face scan) measured or scanned from the physically present user.

By providing for authentication in the proxy signing device and by making one of the plural data items provided to the signing device depend on a random number previously generated by the signing device solely for use in conjunction with obtaining the current digital signature, high immunity is provided against the signing device being spoofed by a block replay of presentations of variations of previous communications with the signing device, or by a man-in-the-middle attack. Further, the use in the authentication process of user identifying data which could only have been obtained by interaction with a physically present user at the user equipment provides high immunity against impersonation of the user.

Also, in accordance with the present invention, user apparatus is provided for cooperating with a proxy signing device via a communication path including a network for forming a digital signature of a user to whom is assigned a private key/public key. The user apparatus comprises user interaction means for a user to indicate approval of a document, computation means configured for forming first and second data items to be provided to the signing device via the communication path, said first data item being derived from a hash of the approved document, and said second data item being derived from a combination including said hash of the approved document and a random number computed by the signing device. The apparatus is also characterized in that the user interaction means is further configured for obtaining user identifying information from the user (password or passphrase or biometric information such as fingerprint, voiceprint, retina scan, face scan) and in that the combination from which the second data item is derived further comprises user identifying data derived from the obtained user identifying information. Also, the second data item is derived from said combination by hashing together the items of said combination.

The present invention also comprises a method for forming and supplying a digital signature of a user of a document comprising generating a random number in a signing device, supplying the random number to user equipment, and forming in the user equipment a first data item derived from a hash of the document and a second data item derived from a combination including said hash of the document and said random number. The inventive method further comprises authenticating in the signing device a hash of the document derived from said first data item if data derived by the signing device from the combination including the derived hash of the approved document and a previously generated random number stored in the signing device equals data derived from said second data item, and if the derived document hash is authenticated, encrypting the derived document hash in the signing device with a private key of the user stored in the signing device and sending the digital signature from the signing device via the network to a recipient device. Another aspect of the inventive method is that user identifying data which is derived from user identifying information obtained from a user physically present at the user equipment forms part of the combination from which the second data is derived, and that the user identifying information is stored in the signing device and used by it in the authentication process.

Other objects, features and advantages of the present invention will become apparent upon perusal of the following detailed description when taken in conjunction with the appended drawing, wherein:

DETAILED DESCRIPTION OF THE PREFERRED EMBODIMENTS

It should be understood that while the present invention is discussed hereinafter in terms of an exemplary system and method for producing digitally signed documents by users over the Internet using a smartcard as a secure proxy signing device for an individual user, the principles of the present invention are equally applicable to use of other proxy signing devices, such as proxy signing servers for producing digital signatures on behalf of a plurality of users, and to the production of digital signatures of a variety of data, programs, or files, or other "documents", whether originated, modified or merely reviewed by users. In any event, the digital signature may be thought of as manifesting an approval by the user of a document. The principles of the invention are also applicable to various systems and methods requiring encryption in a proxy device in which one or more private keys are maintained.

In the system described herein, a private key/public key pair, ID (which may be the initials or name of the user, providing they are unique) and user identifying data U consisting of a password, passphrase or a hash thereof, or data derived from biometric information (fingerprint, voiceprint, retina scan, or face scan), such as by hashing, are associated with each user. The public/private key pair for each user is preferably RSA, although these key pairs may be implemented pursuant to any public key cryptosystem including El Gamal and those based on elliptic curve cryptography. The encryption/decryption algorithms employed in such systems are referred to as asymmetric, because different keys are employed for encryption and decryption.

A passphrase consists of a fanciful series of words. It is very difficult to guess passphrases as opposed to passwords as there are many possible phrases. For example, a particularly good passphrase may concatenate two phrases which are in different languages. Guessing such a passphrase would be extremely difficult using normally available computer power. Similarly, biometric information is quite unique and immune to a guessing attack.

Figure 1:
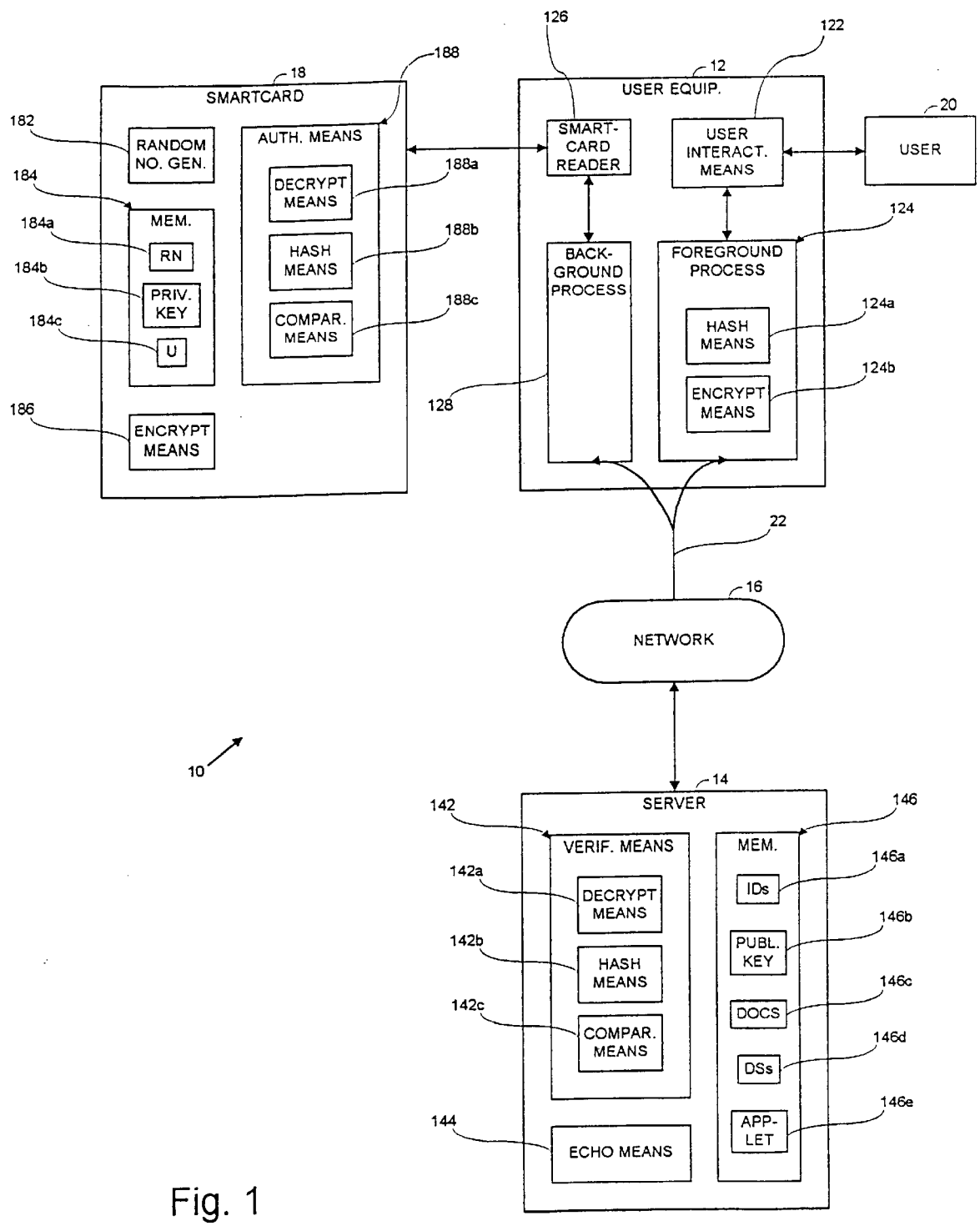
FIG. 1 is a schematic diagram of an exemplary system in accordance with the present invention for utilizing a smartcard for digitally signing a document.

Referring first to FIG. 1, the exemplary system 10 in accordance with the present invention comprises a plurality of computer stations, terminals or other portable or desktop user computing and/or communication equipment, of which one user equipment 12 is illustrated, which are interconnected to or capable of communicating with a server 14 via a network 16. Server 14 is preferably a web server and network 16 may be the Internet or an intranet supporting TCP/IP. User equipment 12 has user interaction 122 such as a mouse and keyboard for receiving input from a user 20 or provides by biometric information (fingerprint, voiceprint, retina scan, or face scan) by measurement or scanning of a physically present user in order for user identifying data U to be derived. User interaction means 122 communicates with a foreground process or front end 124, in general a web browser carried on by a multitasking processor (not shown) of user equipment 12. Foreground process communicates with network 16 which is not secure, and ultimately server 16, via a wired or wireless link 22 between user equipment 12 and network 16. Further, a smartcard reader 126 associated with user equipment 12 is configured for coupling to the user's smartcard 18 for communication therewith, and is controlled by a background process or back end 128 of the user equipment which also routes communication to and from smartcard 18 to network 16, and ultimately server 14, via link 22.

Foreground process 124 is controlled by execution of a Java applet which is sent from server 14 to user equipment along with a blank document $D_0$ (which may be integrated in the applet) when the document system of the server is accessed. The applet implements hashing means and encryption means functions 124a, 124b, respectively and other mathematical functions necessary to form the data mentioned herein as being formed by foreground process 124, as well as handling the communication with user interaction means 122 as the user 20 fills out or completes the document. When the document has been filled-out and approved by the user so as to constitute an approved document $D_f$, the applet causes the latter to be sent to server 16.

As previously mentioned, the Java applet running under a browser cannot access smartcard reader 126 or background process 128, thereby necessitating that all communication between the foreground and background processes 124, 128 take place by server echoing. For example, data is sent from the foreground process to the background process by the circuitous route of the foreground process sending the data to the server and the server sending the data to the background process. Since this insecure route exposes the communication to and from smartcard 18 to being recorded and replayed by a malicious person monitoring the network, security measures are taken including the provision of a random number generator 182 and an authentication means 188 in the smartcard 18 and the generation of a second data item $I_2$ by foreground process 124 which is a function of the generated random number RN and is used by the authentication means 188 of smartcard 18 to determine whether or not a document hash $H_0$ derived from a first data item $I_1$ presented to the smartcard is authentic.

Random number generator 182 is preferably a true random source using a noisy natural phenomenon. A suitable source is a noisy reverse biased zener diode which produces shot noise in its current flow, and the random number length is preferably chosen to be 256 bits in length, although a length of 128 bits is also usable.

In the applet controlled foreground process 124, hashing means 124a is used to apply a secure hash function (SHA-1 or RIPEMD) to a filled-in document $D_f$ (or other approved document) to form $H_0$, which is then encrypted by an asymmetric algorithm such as RSA, with the public key of the user to form the first data item $I_1$. Hashing means 18 is also used in forming a second data item $I_2$ by hashing together $H_0$, the random number RN previously generated by random number generator 182 of smartcard 18 and communicated to foreground process 124, and user identifying data U consisting of a password, passphrase (or a hash thereof), or a hash of biometric information. The random number RN had been communicated to foreground process 124 by server echoing in a manner which will be more fully explained later. There are many techniques known to those of ordinary skill in the art for hashing together a plurality of data items to form a data string of fixed length, any of which are suitable. A sufficient technique is applying a hash function to a concatenation of the data items to form a hash of at least 128 bits in length (160 bits if SHA-1 is used).

Smartcard 18 also includes a memory 184 for storing at least the most recently generated random number RN, and the user's private key and user identifying data U (password or passphrase or hash of biometric information), which has previously been loaded in a secure manner during a setup phase when the smartcard was issued with a generated private key assigned to the user and with the user's identifying data U derived from information entered by the user, in the case of a password or passphrase, or from information scanned or measured with respect to the user, in the case of biometric information. Further, an encryption means 186 is included for forming a digital signature DS in a standard manner by encrypting a document hash $H_0$ with the user's private key, but in accordance with the present invention, only if document hash $H_0$ is authenticated by the authentication means 188.

Authentication means 188 includes a decryption means 188a for decrypting the received first data item $I_1$ using the private key of the user read from memory section 184b to derive document hash $H_0$, and a hashing means 188b for applying the same "hashing together" operations to the derived document hash $H_0$, and the most recently generated random number RN and the user identifying data U read from memory 184, as were applied by hash means 124a. Authentication means 188 also comprises a comparison means 188c for comparing the "hashing together" result with the received second data item $I_2$. If these items are equal, the derived document hash $H_0$ is considered authentic, i.e. having come from the user equipment 12 of the user 20 with the assigned user being physically present, and it is used by encryption means 186 to form the digital signature DS, which is then sent to server 14 via network 16.

Server 14 comprises an authentication means 142, including, as is typical for authenticating the digital signature DS received from smartcard 18, a decryption means 142a for decrypting DS to compute document hash $H_0$ in one way, hashing means 142b for applying the same secure hash function used by hashing means 124a *to the filled-in document $D_f$* received from foreground process 124 to compute document hash $H_0$ in another way, and a comparison means for comparing the document hashes computed in these two ways. If they are the same the digital signature DS and filled-in document $D_f$ are considered verified.

Server 14 comprises a memory 146 which may be or include RAM, ROM, a hard disk, or other memory or media. Memory 146 contains respective sections 146a–d, or fields in a data structure, for storing user IDs, public keys, documents and associated digital signatures DS, respectively, for all users, which are indexed or otherwise addressable or retrievable by ID, and also a section 146e for storing one or more applets. In addition, an echo means 144 of the server 14 is used for enabling communication between the foreground and background processes 124, 128 of user equipment 12.

Figure 2:
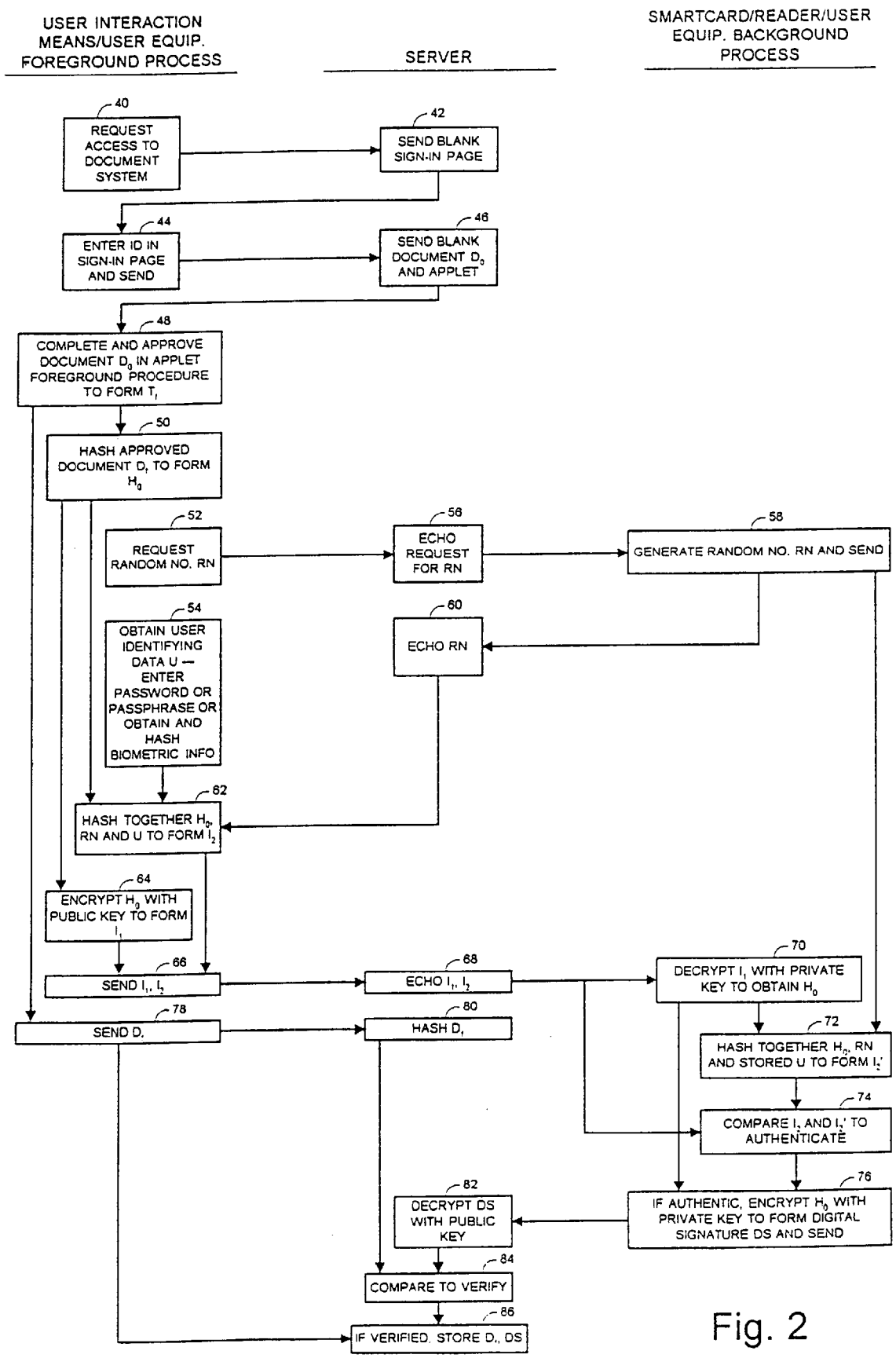
FIG. 2 is a data flow chart which indicates in three separate columns the method steps performed by different portions of the system of FIG. 2.

The operation of the system shown in FIG. 1 will be best understood by further reference to the flowchart of FIG. 2. As shown, the operation begins at block 40 with the user 20 causing, by input to user interaction means 122, a request to be sent from user equipment 12 to server 14 for access to the document system, and the server responding at block 42 to this request by sending a blank sign-in page to the user equipment. The user then, at block 44, enters his ID in the sign-in page via user interaction means 122 which is sent by the user equipment 12 to the server 16, and the server responds at block 46 by sending a blank document $D_0$ and associated applet to the user equipment for controlling the foreground process 124. Thereafter, the completed document $D_f$ is formed and approved by the user at block 48 via user interaction means 122 and under the control of the applet. The completed document $D_f$ thus formed in the foreground process 124 is hashed at block 50 by the hashing means 124a functionality of the applet to form $H_0$.

At block 52, which may occur earlier than as shown, foreground process 124 requests a random number RN, which request is echoed by the server at block 56 so that it reaches the smartcard 18 via the background process 128. In the smartcard, at block 58, generator 182 generates a random number RN which is stored in memory section 184a and sent to the server via background process 128, and at block 60 is echoed by the server to foreground process 124. Also, at block 54, which may also occur earlier than as shown, the user identifying data U is obtained as a result of interaction of user 20 with user interaction means 122. In particular, the user enters his password or passphrase or the user's biometric information is obtained by measuring or scanning with respect to the physically present user and is then hashed to a fixed length of at least 128 bits (160 bits if SHA-1 is used) so that the user identifying data U is available to foreground process 124.

The second data item $I_2$ is formed at block 62 by foreground process 124 hashing together document hash $H_0$, random number RN and user identifying data U to a fixed length of at least 128 bits (160 bits if SHA-1 is used). also the first data item $I_1$, is formed at block 64, which may occur earlier than as shown, by encrypting document hash $H_0$ using the public key of the user. The public key of the user must be provided to foreground process 124 with a certificate from a trustworthy source in order to counter a man-in-the-middle attack. Preferably, the public key of the user and certificate are sent by the server along with the blank document and applet at block 46, although, alternatively, if the smartcard were configured to supply a certificate from such a source, it could have supplied the public key of the user and certificate along with the generated random number at block 58. The first and second data items $I_1$, $I_2$ are sent at block 66 by foregound procees 124 to server 14 where they are echoed at block 68 to smartcard 18 via background process 128.

In smartcard 18, at block 70 first data item $I_1$ is decrypted by decryption means 188a with the private key of the user to obtain the document hash $H_0$. Then at block 72, the obtained document hash $H_0$, and the last computed random number RN and user identifying data U read from memory 184 are hashed together by hashing means 188b to form a derived second data item $I_2$' which at block 74 is compared by comparison means 188c to the received second data item $I_2$. If these items are the same, the derived document hash $H_0$ is authenticated and at block 76, it is encrypted with the private key of the user to form the digital signature DS, which is sent to the server 14 via background process 128.

Further, at some point after the filled-in document $D_f$ is formed in foreground process 128, in block 78 it is sent by the foreground process to server 14.

At the server, the verification of the digital signature DS and the approved document $D_f$ proceed in a conventional manner. The received approved document is hashed at block 80 by hashing means 142b, and the received digital signature DS is decrypted at block 82 by decryption means 142a, using the public key of the user. Then the results of these operations are compared at block 84 by comparison means 142c. If the compared items are equal the approved document $D_f$ and digital signature DS are verified and are stored at block 86 in timecard storage sections 146c, 146d, respectively, of memory 146.

It should now be appreciated that the objects of the invention have been satisfied. While the present invention has been described in particular detail, it should also be appreciated that numerous modifications are possible within the intended spirit and scope of the invention.

What is claimed is:

1. A digital signing device for forming a digital signature of a document using at least one private key stored within the signing device, comprising:

means for using a plurality of data items supplied to the signing device to derive a document hash and to thereafter authenticate the derived document hash on a condition that first data derived at least in part from one of said data items is the same as second data derived from another of said data items, the derived second data being equal to said another of said data items; and, means for encrypting the document hash with the at least one stored private key to form the digital signature only if the derived document hash is authenticated; and a random generator, and the first data is also derived in part from a number stored in the device which was previously generated by the random number generator.

2. A digital signing device as claimed in claim 1, wherein the device further has user identifying data stored therein, and the first data is also derived in part from the stored user identifying data.

3. A digital signing device as claimed in claim 2, wherein the user identifying data is derived from a passphrase or from biometric information.

4. A digital signing device as claimed in claim 1, wherein the document hash is derived from said data by decrypting with said private key.

5. A digital signing device for forming a digital signature of a document using at least one private key stored within the signing device, comprising:

means for using a plurality of data items supplied to the signing device to derive a document hash and to thereafter authenticate the derived document hash on a condition that first data derived at least in part from one of said data items is the same as second data derived from another of said data items, the derived second data being equal to said another of said data items; and, means for encrypting the document hash with the at least one stored private key to form the digital signature only if the derived document hash is authenticated; and user identifying da stored therein, and the first data is also derived in part from the stored user identifying data.

6. A digital signing device as claimed in claim 5, wherein the user identifying data is derived from a passphrase or from biometric information.

7. User apparatus for cooperating with a digital signing device via a network for forming a digital signature on behalf of a user to whom is assigned a private key/public key pair, said user apparatus comprising user interaction means for a user to indicate approval of a document; and computation means configured for forming first and second data items to be provided to the digital signing device via the network, said first data item being derived from a hash of the approved document, said second data item being derived from a combination including said hash of the approved document and a random number previously computed by the signing device and sent to the user apparatus via the network, and said digital signing apparatus comprising means for using said first and second data items to derive and authenticate a document hash, and means for encrypting the derived document hash with at least one private key stored in the digital signing device to form the digital signature only if the derived document hash is authenticated.

8. User apparatus as claimed in claim 7, wherein the second data item is derived from said combination by hashing together the items of said combination.

9. User apparatus as claimed in claim 7, wherein said combination further comprises user identifying data.

10. User apparatus as claimed in claim 9, wherein said user identifying data is derived from a passphrase or from biometric information of the user.

11. A method of forming a digital signature of a user comprising:

receiving in user equipment from a server via a network a document to be approved;

generating a random number in a signing device and supplying the random number to the user equipment;

forming in the user equipment a first data item derived from a hash of the approved document and a second data item derived from a combination including said hash of the approved document and said random number;

authenticating in the signing device a hash of the approved document derived from said first data item if data derived by the signing device from the combination including the derived hash of the approved document and a previously generated random number stored in the signing device equals data derived from said second data item; and only if the derived document hash is authenticated:

encrypting the derived document hash in the signing device with the private key of the user stored in the signing device to form the digital signature.

12. A method as claimed in claim 11, wherein said combination further includes user identifying data.

13. A method as claimed in claim 12, wherein the user identifying data is derived from a passphrase or from biometric information.

* * * * *